Sept. 12, 1950        T. W. WINSTEAD        2,522,079
METHOD OF MAKING INFLATABLE ARTICLES
Filed Nov. 20, 1946        2 Sheets-Sheet 1
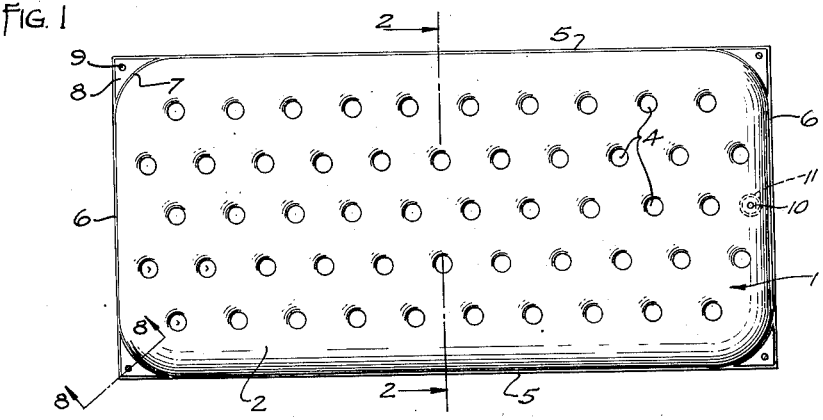
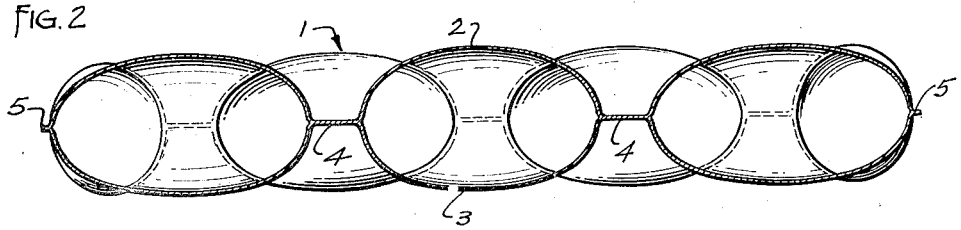
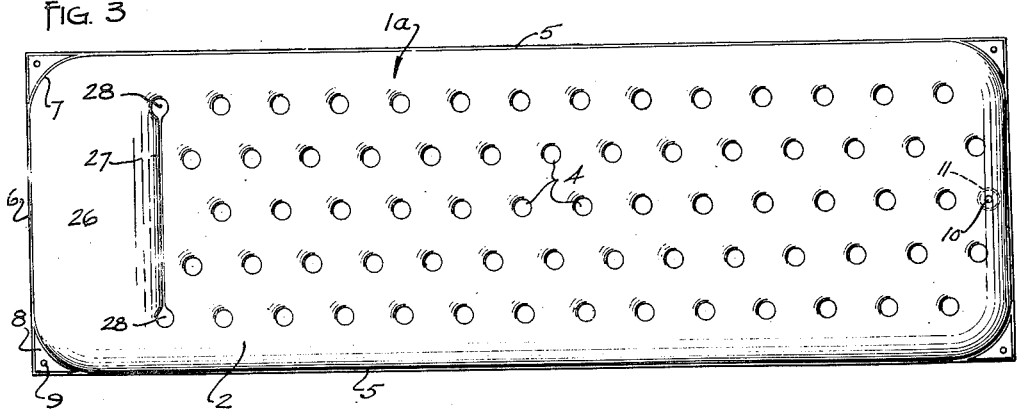
INVENTOR
THOMAS W. WINSTEAD
BY
Semmes, Keegin, Robinson and Semmes
ATTORNEYS Sept. 12, 1950  T. W. WINSTEAD  2,522,079
METHOD OF MAKING INFLATABLE ARTICLES
Filed Nov. 20, 1946  2 Sheets-Sheet 2
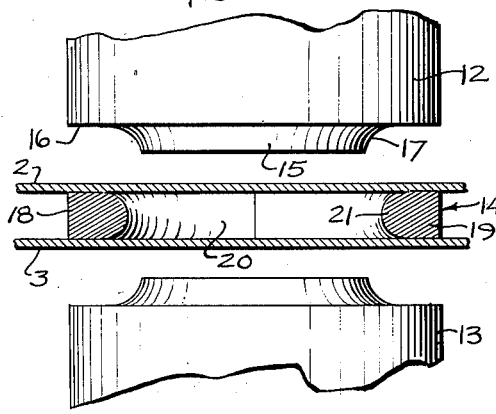
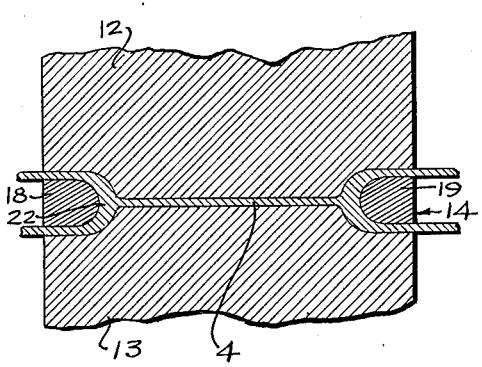
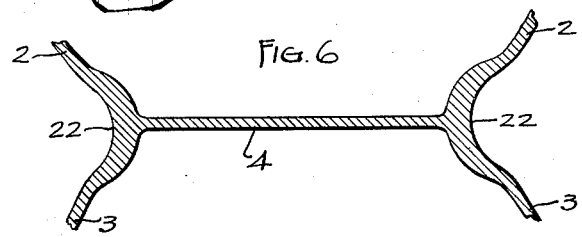
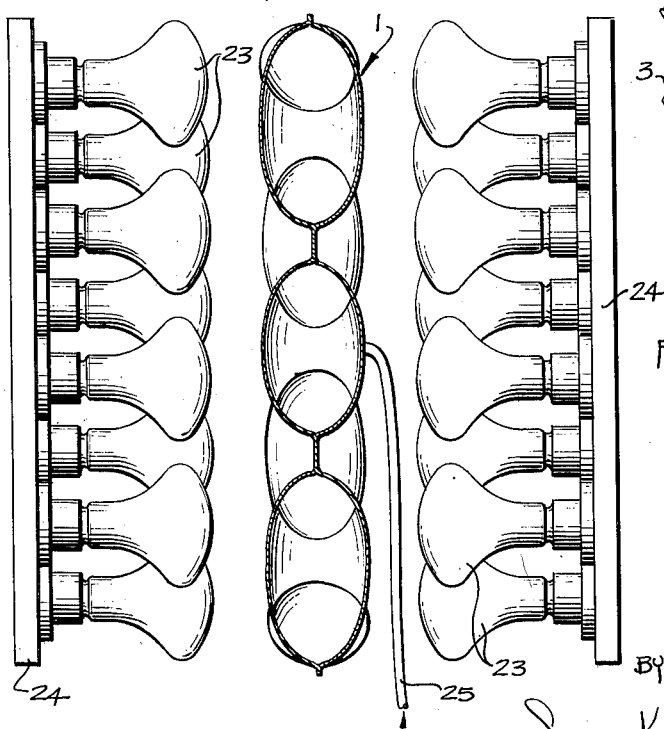
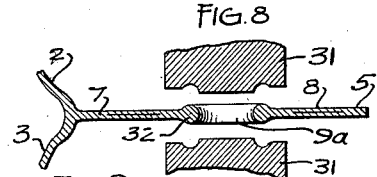
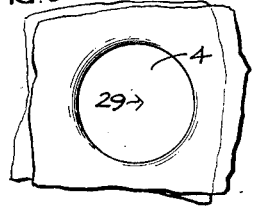
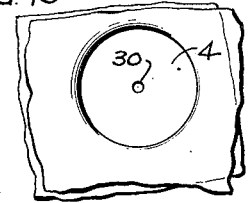
INVENTOR
THOMAS W. WINSTEAD
BY Semmes, Keegin, Robinson and Semmes
ATTORNEYS Patented Sept. 12, 1950

2,522,079

UNITED STATES PATENT OFFICE 2,522,079

METHOD OF MAKING INFLATABLE ARTICLES

Thomas W. Winstead, Baltimore, Md.

Application November 20, 1946, Serial No. 711,002

15 Claims. (Cl. 154—85)

The present invention relates generally to inflatable articles of a class which includes floats, air-mattresses, cushions and the like. More particularly the invention relates to such articles fabricated from superposed sheets of flexible, thermoplastic maaterial which are heat-seamed together at desired points to provide a dimpled or tufted appearance, and to a method of making such articles.

Flexible rubber and plastic sheeting has been extensively used in the manufacture of air-mattresses, floats and similar articles. Various methods have been employed in the construction of these articles to maintain a generally parallel spaced relationship between the upper and lower walls. One method has been joining the upper and lower walls together by transverse partitions which form the interior into a number of parallel cells. This provides a substantially rigid inflated body, particularly in the direction of the partitions but it is an expensive and time-consuming operation and requires a substantial amount of material. Another method has been seaming together two appropriately cut sheets of the material at their marginal edge, and additionally at selected, spaced points or areas between the edges, to provide a tufted effect so that when the article is inflated it will assume a relatively flat shape. This latter method has also left much to be desired in the article both in the matter of appearance and strength. In the first place, the article has been unable to accept inflation sufficient for desirable rigidity without producing objectionable wrinkles in the material, particularly about the dimpled or tufted areas. In the second place, stresses in the inflated article are concentrated in the material immediately adjacent the tufting seams, and these seams, or the material itself adjacent thereto, has often ruptured when the article has been over-inflated or the contained air subjected to unusual compression forces in use. Another drawback to these prior tufted articles has been the inability of the dimples to "breathe," thereby producing a vacuum cup effect causing the article to adhere to surfaces with which it is in contact.

It is therefore an object of this invention to overcome the above and other disadvantages heretofore found in tufted air-mattresses, floats, and the like.

Another object of the invention is to provide an inflatable, tufted mattress, float or the like made of thermoplastic sheet material and capable of relatively thick inflation to produce a relatively rigid article without surface wrinkles.

Still another object of the invention is to provide an inflatable, tufted mattress, float or the like made of thermoplastic sheet material in which the material adjacent the regions of high stress concentration is thickened to strengthen these regions.

Yet another object of the invention is to provide an inflatable, tufted mattress, float or the like made of thermoplastic sheet material and with means for the dimples of the inflated article to breathe.

A further object of the invention is to provide an inflatable, tufted mattress, float or the like made of thermoplastic sheet material and in which the tufted surfaces are preformed substantially in their fully inflated condition without wrinkles.

With the above and other objects and advantages in view the invention consists in the parts and combinations and procedural steps hereinafter set forth with the understanding that various changes may be made therein, by those skilled in the art, without departing from the spirit of the invention.

In order to make the invention more clearly understood preferred embodiments thereof are shown in the accompanying drawings in which:

Figure 1 is a plan view of a float made in accordance with the invention.

Figure 2 is a cross sectional view taken on the line 2—2 of Figure 1 looking in the direction of the arrows.

Figure 3 is a plan view of an air-mattress made in accordance with this invention.

Figure 4 is a diagrammatic view partly in elevation and partly in cross section showing the relative arrangement of material, seaming electrodes and die for making the circular seams or tufts.

Figure 5 is a cross sectional view of the parts shown in Figure 4 with the electrodes in seaming position and illustrating the method of extruding thermoplastic material into the regions of the seamed sheets at the border of the seam.

Figure 6 is a fragmental cross sectional view of one of the circular seams or tufts showing the thickened section of the material at the border of the seam.

Figure 7 is a diagrammatic view partly in elevation and partly in cross section illustrating an arrangement for applying radiant heat to the article while inflating the same to relieve tension stresses in the material.

Figure 8 is a detailed cross sectional view taken on the line 8—8 of Figure 1 looking in the direction of the arrows.

Figure 9 is a fragmental plan view of one of the circular seams or tufts showing one means of providing a breathing orifice therein.

Figure 10 is a view similar to Figure 9 showing another means of providing a breathing orifice in the circular seam.

For the purpose of this application "tufted" shall refer to the dimpled surface appearance of the article which is very similar to tufted cushions and the like in upholstered furniture, and "tufting" shall refer to the sealing together of the upper and lower sheets of the material forming the article in definitely located spaced spots to provide this dimpled appearance.

In making the mattress, float or other inflatable articles according to this invention, the method generally comprises joining together two rectangular sheets of flexible and relatively non-elastic thermoplastic material along the marginal edges, and at equally spaced circular spots between the marginal edges, by the application of heat and pressure. In making these seams, the applied heat and pressure are so controlled as to extrude a portion of the thermoplastic from the regions forming the seams into regions bordering the seams to thicken and consequently strengthen these border regions in which stresses in the inflated articles are normally concentrated. A suitable one-way inflating valve is affixed preferably adjacent one end of the article.

After seaming, as above, the article is inflated to a desired thickness while heat, preferably radiant, is applied to the whole area of the article. This heat relieves the tensioning stresses in the thermoplastic material and permits inflation to a thickness greater than heretofore practical without producing wrinkles in the material, particularly around the dimples or tufts and thereby add to the rigidity in all directions to the inflated article.

In making a mattress, a pillow may be formed at one end by means of a straight seam extending parallel with the end from near one longitudinal edge to near the other. This pillow portion preferably is not tufted like the remainder of the mattress and adds both to its comfort and appearance.

Referring to the particular embodiments illustrated in the drawings, there is shown in Figures 1 and 2, a float 1 made from a pair of rectangular sheets 2 and 3 of flexible, relatively thin and relatively non-elastic thermoplastic material. These sheets are superposed and joined together by circular seams or spot welds 4 equally spaced one from the other over the area between the marginal edges, and by straight seams or welds 5 and 6 respectively along the opposite edges. Preferably, the edge seams are connected at the corners by radius seams 7 to form flat tabs 8 on the inflated float. These tabs may be provided with apertures 9 for the reception of a cord or rope for pulling or other function in the use of the float.

Adjacent one end of the float, an inflating aperture 10 is provided which is fitted with a check or one way valve 11 of suitable design. The circular seams 4 seal the inner surfaces of the upper and lower sheets together at spaced intervals over the area of the float so that the float may be inflated into a relatively flat body having dimpled or tufted upper and lower surfaces.

Tension stresses in the material of the inflated article are concentrated at the circular seams. It has been found however, that considerably improved strength in these regions is obtained by spacing the circular seams on equally spaced centers, that is, spacing each circular seam equidistant from those surrounding it, as shown in Figure 1. Further increase in strength of the material in these regions of stress concentration is achieved by extruding and molding a portion of the material forming the seams into a thickened section bordering the seams as will be described.

In assembling and seaming the float, high frequency, heat sealing and molding methods preferably are employed, the circular seams 4 being made prior to the edge seam. A preferred method of making the circular seams 4 is diagrammatically illustrated in Figures 4 and 5, and is carried out, generally, by bringing together two opposed, circular electrodes 12 and 13, between which the assembled sheets 2 and 3 are placed, to press the sheets together into a ring shaped die 14 placed between the sheets. Figures 4 and 5 show forming a single circular seam by way of illustration. It will be understood, however, that for accurate spacing and in rapid production, the electrodes 12 and 13 may be suitably ganged in appropriate jigs to make all of the circular seams simultaneously, or to make them in groups or rows. The dies 14, in such cases, will be formed of plates, apertured at the seam centers and also split along seam centers so that they may be withdrawn from between the sheets after the seams are made.

As seen in Figure 4, the ends of the electrodes 12 and 13 are formed with short, circular tips 15 which are of smaller diameter than the body of the electrode, and are fileted smoothly into a radial shoulder 16 by means of a quarter round filet 17. The die 14 is made in two complementary halves 18 and 19 which together define a circular aperture 20 having a half round or half oval wall 21. The diameter of the aperture is slightly larger than the diameter of the electrode tip 17 plus twice the thickness of the thermoplastic material, while the combined lengths of the tips 17 is slightly less than the thickness of the die plus the combined thickness of the two sheets 2 and 3. Thus, when the electrodes are brought together the layers of thermoplastic material are plasticized by the heat of the high frequency field between the electrodes, pressed into the aperture of the die and fused together.

As will be seen in Figure 5, when the electrodes are moved together until the shoulders 16 are spaced from the faces of the die 14 the thickness of the material, the space between the faces of the tips 15 will be less than twice the thickness of the material and a portion of the thermoplastic forming the seam 4 will be extruded radially outwardly into the annular space between the tip filets 17 and the wall 21 of the die and mold a thickened border about the seams the cross sectional contour of which is a smooth filet 22 which gradually thickens from the layers 2 and 3 of the material, forming the walls of the float, to the seam 4. By this means of seaming, the material which falls within the border of the seam and which adds nothing to its strength, has been utilized to strengthen the border region of the seam which is subjected to high stresses in the inflated float, as will be clearly seen from Figure 6.

The marginal seams 5, 6 and 7 may be made by conventional methods as these seams extend over a substantial area and the stresses are more distributed.

After the circular and edge seams are made, as above, a hollow enclosed body is formed which is then inflated while heat is applied to the thermoplastic material. This heat has the effect of relieving tension stresses in the material and permits inflation to a degree where a relatively thick substantially rigid float is obtained without the usual gathering or wrinkles in the material at the circular seams or tufts.

Radiant heat has been found very effective in carrying out this latter operation and may be supplied, as shown in Figure 7, by infrared lamps 23 arranged in banks on opposed parallel panels 24, coextensive with the inflated float and between which the float is suspended or otherwise positioned. Air under pressure may be supplied to the float such as through a tube 25 extending between the filling opening 10 and a source of compressed air. The float is allowed to cool in its inflated condition and may then be deflated. By this method the material has, in effect, been molded to its wrinkle free, thick, inflated shape and when inflated thereafter, will assume this shape.

An air mattress, such as designated 1a in Figure 3, may be made in the manner set forth. Its length would usually be somewhat greater than that of a float, and preferably one end is left untufted to form a pillow such as indicated at 26. This pillow is formed by a straight, transverse seam 27 which terminates in round or teardrop seams at its opposite ends and which are spaced inwardly, somewhat, from the longitudinal edges of the mattress. This seam is made like the round tufting seams 4 by means of appropriately shaped high frequency electrodes and die (not shown) which extrude a portion of the thermoplastic material from that forming the seam into the border regions in the manner already described. The round or teardrop ends materially strengthen the seam at the points of greatest stress concentration.

The tufting forms dimples in the surfaces of the article which, unless allowed to bleed or breathe, have a vacuum cup effect which is particularly pronounced and objectionable in the case of a float when it is wet, causing the float to adhere to surfaces with which it is in contact. To relieve this condition and to provide ventilation for these dimples or hollows to provide a cooler mattress, the bottoms of the tufts, or that portion forming the circular seam, is vented. This is preferably done by means of an angular slit 29, which forms a triangular resilient flap, such as shown in Figure 9, to permit equalization of air pressure on both sides of the dimple. Alternately, the material forming the seam may be punched to form a small aperture 30, such as shown in Figure 10, to serve the same purpose. It will be understood that the aperture 30 may also be molded in the material, at the time the seam is made, with suitably formed electrodes.

The apertures 9 in the corner tabs 8, referred to above, may be punched in the tab, but preferably are molded, as indicated at 9a in Figure 8, by means of electrodes 31 formed to extrude the material therebetween and mold it into a reinforcing bead 32 around the aperture.

From the foregoing it will be seen that the invention provides an air-mattress, float or the like which is relatively simple and economical to manufacture, lends itself to mass production methods and has a pleasing appearance. The methods of making produce a relatively thick and rigid mattress or float from only two sheets of thermoplastic material. Further, the method strengthens the inflated article at points of stress concentration and thereby produce a light weight article of high tensile strength. Moreover, the method of forming produces a mattress or float having a wrinkle free, inflated condition.

I claim:

1. In a method of making inflatable articles fabricated by superposing two flat sheets of thermoplastic material, and heat-seaming adjacent faces of the superposed sheets together at least at the marginal edges thereof to form an enclosed hollow body, the steps of heating the body and inflating the heated body in free air to a desired amount.

2. In a method of making inflatable articles fabricated by superposing two flat sheets of thermoplastic material, and heat-seaming adjacent faces of the superposed sheets together at least at the marginal edges thereof to form an enclosed hollow body, the steps of applying radiant heat to the body in free air, and inflating the heated body to a desired amount.

3. In a method of making inflatable articles fabricated by superposing two flat sheets of thermoplastic material, heat-seaming adjacent faces of the superposed sheets together at least at the marginal edges thereof to form an enclosed hollow body, the steps of applying radiant heat to the body in free air, and coincidentally therewith inflating the body to a desired amount.

4. In a method of making an inflatable float, air-mattress or the like fabricated by superposing two rectangular flat sheets of thermoplastic material, and heat-seaming adjacent faces of the superposed sheets together at the marginal edges thereof and in selected spaced areas between said edges to form an enclosed hollow body, the steps of inflating the body in free air to a desired thickness while heating the same.

5. In a method of making an inflatable float, air-mattress or the like fabricated by superposing two rectangular flat sheets of thermoplastic material, and heat-seaming adjacent faces of the superposed sheets together at the marginal edges thereof and in selected spaced areas between said edges to form an enclosed hollow body, the steps of applying radiant heat to the body in free air, and inflating the body to a desired thickness while heating the same.

6. In a method of making an inflatable float, air-mattress or the like fabricated by superposing two rectangular sheets of thermoplastic material, heat-seaming adjacent faces of the superposed sheets together at the marginal edges thereof and in selected, spaced, circular areas between said edges to form an enclosed hollow body, the steps of applying radiant heat to the body, and coincidentally therewith inflating the same in free air to a desired thickness.

7. A method of making tufted floats, air-mattresses and the like comprising superposing two sheets of thermoplastic material, applying heat and pressure to opposed outer surfaces of the superposed sheets in selected areas thereof to heat-seam the sheets together, and controlling said pressure to extrude a portion of the material from said areas into the regions bordering the areas to thicken the material in said bordering regions, molding the extruded material into a desired configuration, and heat seaming together the marginal edges of said sheets.

8. In a method of making floats, air-mattresses and the like comprising applying heat and opposed pressures to limited areas of superposed thermoplastic sheets in a direction normal to the plane thereof to fuse the sheets together in said areas, and controlling said pressures to extrude a portion of the material lying within the borders of said fused areas into the regions of the sheets bordering said areas to thicken the material in said border regions, while molding the material in said border regions to a desired configuration.

9. In a method of making floats, air-mattresses and the like comprising applying heat and opposed pressures to limited areas of superposed thermoplastic sheets in a direction normal to the plane thereof to fuse the sheets together in said areas, and controlling said pressures to extrude a portion of the material lying within the borders of said fused areas into the regions of the sheets bordering said areas to thicken the material in said border regions, while molding the material of the sheets in said border regions to cross sectional dimensions thickest immediately bordering the fused areas and which taper therefrom to the normal thickness of said sheets.

10. In a method of making tufted floats, air-mattresses and the like comprising applying heat and opposed pressures to substantially circular areas of superposed thermoplastic sheets in a direction normal to the plane thereof to fuse the sheets together in said areas, and controlling said pressures to extrude a portion of the material lying within the borders of said fused areas into the regions of the sheets bordering said areas to thicken the material in said border regions.

11. In a method of making tufted floats, air-mattresses and the like comprising applying heat and opposed pressures to substantially circular areas of superposed thermoplastic sheets in a direction normal to the plane thereof to fuse the sheets together in said areas, and controlling said pressures to extrude a portion of the material lying within the borders of said fused areas into the regions of the sheets bordering said areas to thicken the material in said border regions, while molding the material in said border regions to a desired configuration.

12. In a method of making tufted floats, air-mattresses and the like comprising applying heat and opposed pressures to substantially circular areas of superimposed thermoplastic sheets in a direction normal to the plane thereof to fuse the sheets together in said areas, and controlling said pressures to extrude a portion of the material lying within the borders of said fused areas into the regions of the sheets bordering said areas to thicken the material in said border regions, while molding the material of the sheets in said border regions to cross sectional dimensions thickest immediately bordering the fused areas and which taper therefrom to the normal thickness of said sheets.

13. In a method of making inflatable articles fabricated by superposing two flat sheets of thermoplastic material, and heat-seaming adjacent faces of the superposed sheets together at least at the marginal edges thereof to form an enclosed hollow body, the steps of heating the body, inflating the heated body to a desired amount in free air, and then cooling the article in inflated condition.

14. In a method of making an inflatable float, air-mattress or the like fabricated by superposing two rectangular sheets of thermoplastic material, and heat-seaming adjacent faces of the superposed flat sheets together at the marginal edges thereof and in selected spaced areas between said edges to form an enclosed hollow body, inflating the body to a desired thickness in free air while heating the same, and then cooling the article in inflated condition.

15. A method of making tufted floats, air mattresses and the like comprising superposing two sheets of thermoplastic material, applying heat and pressure to opposed outer surfaces of the superposed sheets in selected areas thereof to heat-seam the sheets together, and controlling said pressure to extrude a portion of the material from said areas into the regions bordering the areas to thicken the material in said bordering regions, molding the material in said border regions to desired configuration heat-seaming together the marginal edges of said sheets, and cutting through the material in the restricted portions of said selected seamed areas to provide air passages therethrough.

THOMAS W. WINSTEAD.

REFERENCES CITED

The following references are of record in the file of this patent:

UNITED STATES PATENTS

| Number | Name | Date |
|---|---|---|
| 1,139,341 | Cigol | May 11, 1915 |
| 1,603,465 | Hopkinson | Oct. 19, 1926 |
| 1,671,642 | Hopkinson | May 29, 1928 |
| 1,920,961 | Anderson | Aug. 8, 1933 |
| 2,272,290 | Beal | Feb. 10, 1942 |
| 2,367,642 | Helwig | Jan. 16, 1945 |
| 2,377,946 | Leary | June 12, 1945 |